United States Patent [19]

Foote et al.

[11] 4,195,043
[45] Mar. 25, 1980

[54] RANDOMLY DUMPABLE SELF ORIENTING SPIRAL PACKING ELEMENTS

[75] Inventors: Earl H. Foote, Atwater; Frank D. Moore, Tallmadge; Ralph F. Strigle, Jr., Akron, all of Ohio

[73] Assignee: Norton Company, Worcester, Mass.

[21] Appl. No.: 4,076

[22] Filed: Jan. 17, 1979

[51] Int. Cl.² ............................................. B01F 3/04
[52] U.S. Cl. ........................................ 261/94; 55/90; 210/150; 261/DIG. 72
[58] Field of Search ................................ 261/94–98, 261/DIG. 72; 210/150, 151; 55/90

[56] References Cited

U.S. PATENT DOCUMENTS

| 1,848,576 | 3/1932 | Sandel | 261/DIG. 72 |
|---|---|---|---|
| 1,947,777 | 2/1934 | Huff et al. | 261/94 |
| 2,055,162 | 9/1936 | Weber | 261/94 |
| 2,376,349 | 5/1945 | Frischer | 261/94 |
| 2,615,832 | 10/1952 | Dixon | 261/DIG. 72 |
| 2,940,168 | 6/1960 | Monroe | 261/95 X |
| 3,506,248 | 4/1970 | Starbuck et al. | 261/DIG. 72 |
| 3,914,351 | 10/1975 | McKeown et al. | 261/98 |
| 3,957,931 | 5/1976 | Ellis et al. | 261/98 |
| 4,067,936 | 1/1978 | Ellis et al. | 261/98 |
| 4,122,011 | 10/1978 | Strigle, Jr. | 261/DIG. 72 |

FOREIGN PATENT DOCUMENTS 937597 9/1963 United Kingdom ............ 261/DIG. 72

Primary Examiner—Richard L. Chiesa
Attorney, Agent, or Firm—Walter Fred

[57] ABSTRACT

Precision molded plastic cellular packing elements (10 and 40) of polygonal and curvilinear spriral shape are provided for mass transfer and effluent treatment apparatus. Each spiral element (10 and 40) has more than one convolution (16 and 46), a maximum transverse width (W) significantly greater than its axial height (H) whereby it has a greater tendency to orient itself horizontally and its relatively shorter wall surfaces substantially vertical, angularly spaced ribs (24–26) (52–54) which extend from the axis (x) and interconnect the convolutions; and wherein adjacent wall portions of the ribs and of the spiral convolutions around open end cells of the element are either in alignment or inclined in one direction, or oppositely inclined relative to one another whereby the element may be provided with either or a combination of straight, tapered or oppositely tapered cells.

10 Claims, 7 Drawing Figures

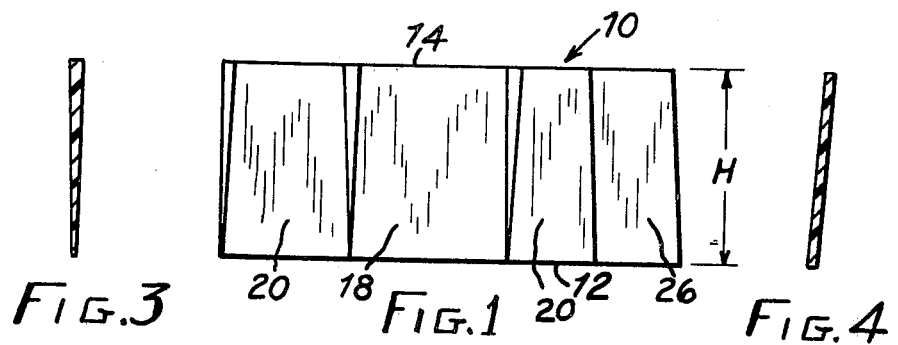
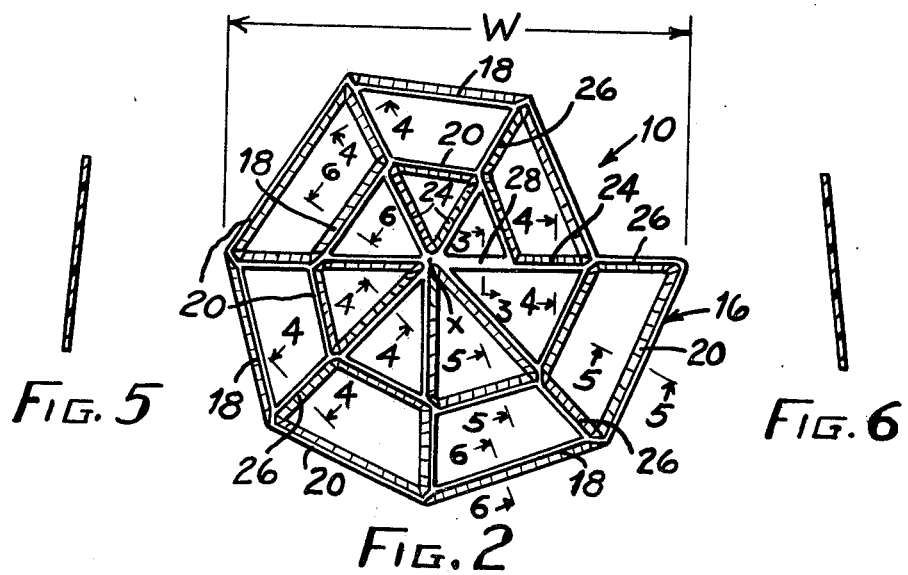
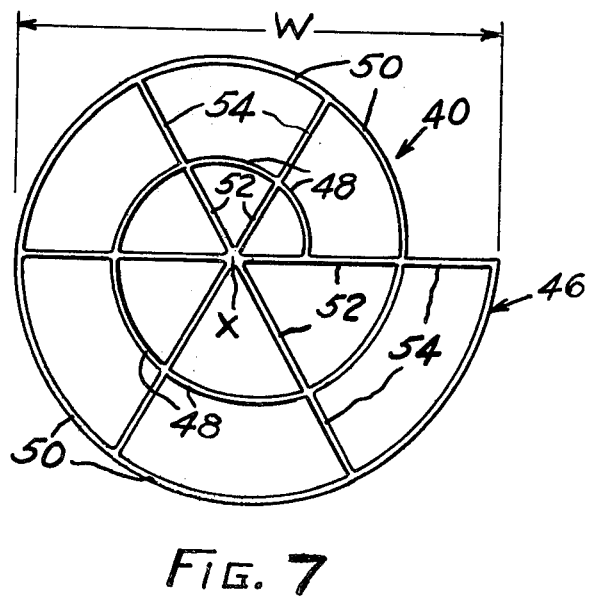

RANDOMLY DUMPABLE SELF ORIENTING SPIRAL PACKING ELEMENTS

TECHNICAL FIELD

The invention relates to random dumped self orienting cellular spiral precision molded plastic tower packing media for fluid - fluid, liquid - gas, and effluent treatment contact towers, vessels or apparatus.

It is desireable in mass transfer and effluent treatment apparatus to provide a bed of effluent packing elements which can be randomly dumped therein, have a greater tendency of self orient horizontally, provide a large number of short non-aligned substantially vertical cells and surfaces which frequently interrupt the flow of fluids passing therethrough, has resistance to fouling and the ability to slough solids and biomass.

BACKGROUND ART

Presently, there are a number of randomly dumped and self orientable packing elements of other than spiral form such as disclosed in U.S. Pat. Nos. 2,055,162; 2,376,349; 3,914,351; 3,957,931 and 4,067,936. Others of spirally wound corrugated ribbon form, which are stacked and not dumpable, are disclosed in U.S. Pat. Nos. 2,940,168 and British Pat. No. 937,597.

Some of the prior art elements have a maximum transverse dimension or diameter greater than the axial height or length between the opposite sides or ends thereof. Hence, they have a tendency when stacked to remain in that position and when randomly dumped to assume a position, with its maximum transverse dimension and opposite sides thereof extending substantially horizontal.

Also, disclosed in said British Patent are continuous ribbons of suitable thermoplastic material which can be spirally wound to form elements of other geometrical shape such as rectangular or square.

When packing elements with long vertical dimensions are stacked in a bed there is substantially no cross flow of liquid normal to the direction of gas and liquid flow. As a result the initial pattern of liquid distribution imposed above the bed, continues substantially uninterrupted through the bed. Thus any dry areas at the top of the bed continue to be dry throughout the bed with the resultant loss of volume of the packing actually engaged in mass transfer.

The dumpable spiral packing elements of the invention disclosed hereinbelow have superior performance with respect to orienting themselves horizontally, resistance to fouling and the ability to slough solids and biomass. This is because substantially all of the surface area will orient in a substatically vertical mode, and the shorter vertical surfaces of adjacent non-aligned elements will more frequently interrupt the liquid or effluent flow. Interruptions of flow of course, enhances oxygen absorption or mass transfer. Further, because the spiral packing elements do not have a uniform radius, they have a greater tendency when dumped to orient in a random fashion with respect to any cross section of the tower normal to the direction of gas and liquid flow. This avoids pattern packing of the elements within the bed and contributes to improved internal liquid distribution. Also, because the packing media or elements are placed at random and are not stacked members with long vertical dimensions, apparatus packed with the spiral elements of the invention is much less sensative to the quality and non-uniformity of the initial liquid distribution above the bed.

DISCLOSURE OF THE INVENTION

Disclosed are randomly dumpable, self orientable precision molded plastic spiral cellular packing elements or media. Each element comprising a continuous spiral wall member with inner and outer spaced convolutions of either curvilinear or polygonal shape extending around the spiral axis and connected by radially extending angularly spaced ribs or spokes. The maximum transverse dimension or width of each packing element is greater than its axial height or length whereby it has a tendency when dumped into a vessel to orient itself with its maximum transverse dimension and opposite sides substantially horizontal.

The cellular spiral packing elements have a plurality of either straight or tapered open ended cells or passages of varying size enclosed by either arcuately curved, straight or flat wall portions of the spiral member and the radial ribs or spokes of varying length. Adjoining wall portions of the spiral member and of the radial ribs are either aligned in the same plane or oppositely inclined relative to each other and the plane of the spiral axis.

BRIEF DESCRIPTION OF THE DRAWINGS

FIG. 1 is a side view of the packing element shown in FIG. 2;

FIG. 2 is a plan view of the packing element shown in FIG. 1;

FIG. 3 is a sectional view of a radial spoke of rib taken on line 3—3 of FIG. 2;

FIG. 4 is a sectional view of an inclined radial spoke or rib taken on line 4—4 on FIG. 2;

FIG. 5 is a sectional view of an inclined wall portion of the spiral member on line 5—5 of FIG. 2;

FIG. 6 is a sectional view of an oppositely inclined wall portion of the spiral member taken on line 6—6 of FIG. 2; and FIG. 7 is a plan view of another embodiment of the invention.

BEST MODE FOR CARRYING OUT THE INVENTION

In FIGS. 1–6 of the drawing is shown, a preferred, precision molded, plastic cellular spiral tower packing element 10 of polygonal shape. The element 10 has substantially parallel opposite top and bottom sides or ends 12 and 14. A continuous multisided spiral wall, band or member 16 of polygonal shape extends more than one and if desired more than the two spaced convolutions shown around the spiral axis and axially between the opposite sides of the element 10. The multisided polygonal spiral wall member 16 has for example, a plurality of adjoining generally straight flat angular wall portions 18 and 20 oppositely inclined relative to each other and the axis x of the spiral element 10. Alternatively, one or more or all of angular wall portions 18 and 20 could have a corrugated or saw tooth configuration comprised of either or a combination of curved and straight surfaces on one or both sides thereof.

The alternate inclined wall portions 18 diverge away from side 12 and the axis x as shown in FIG. 2 and and FIG. 6 while the oppositely inclined wall portions 20 in between converge from side 12 toward the axis x as shown in FIGS. 2 and 5. Obviously, the relationship is reverse to that described when viewed from the opposite side 14 of the element 10.

Interconnecting the inner and outer most convolutions of the spiral wall member 16 and central portion of the element 10 are a plurality of angularly spaced radially extending ribs comprising adjacent oppositely inclined inner and outer ribs or wall portions 24 and 26. The pair of inner ribs or wall portions 24 and situated at opposite angular spaced sides of an inner cell are oppositely inclined relative to each other, the outer pair of oppositely inclined ribs 26 at opposite angular spaced sides of the adjacent outer cell and a radial plane passing through the axis x.

As shown in FIG. 2 by surface shading the wall portions of the spiral member and ribs enclosing every other alternate ones of the cells within the spiral convolutions about the axis x are inclined and converge toward the center of the cell while the wall portions of the spiral member and ribs enclosing the cells adjacent to or between them are oppositely inclined and diverge away from the center of the cell. Thus, the packing element 10 has a plurality of oppositely tapered cells enclosed by convergent wall portions adjacent cells enclosed by divergent wall portions.

The inclination of the spiral wall portions 18 and 20 and ribs 24 and 26 relative to a plane parallel to the axis x and/or normal to the opposite sides 12 and 14 is preferably about 4° but may be inclined at an angle of from 0° to 20°.

It can be seen that the inner cells of spiral element 10 have a triangular shape and increase in size, area and volume progressively from the smallest at the beginning or inner end to the largest at the outer end of the convolution of the spiral member 16.

In FIG. 4 there is shown the cross sectional configuration of each of the ribs 24 and 26 of the element 10 and in FIGS. 5 and 6 the cross sectional configuration of the spiral wall portions 18 and 20 extending between the ribs. As shown, the ribs 24 and 26 have a wall thickness slightly greater than the wall thickness of the angular wall portions 18 and 20 of the spiral member 16. However, they may be of substantially the same wall thickness and in any case the wall thickness should be sufficient to prevent collapse thereof and to withstand the load of a column of the packing elements above it in the bed of a packed tower.

Referring to FIGS. 2 and 3 the element 10 also has an inner tapered rib 28 with oppositely inclined outer wall surfaces connecting the axis x to the beginning or inner end of the inner convolution. Preferably the wall thickness of the rib 28 tapers slightly from its thickest edge at one side or end 12 to a thinner edge at the opposite side or end 14 of the element. Alternatively, the rib 28 may be tapered opposite to that shown, or have a wall of uniform thickness.

In FIG. 7 there is shown a similar spiral packing element 40 of substantially the same size; maximum transverse dimension W and axial height H between its opposite ends or sides as the element 10. Packing element 40 also comprises a continuous substantially circular curvilinear spiral wall, band, or member 46 extending more than one and if desired more than the two spaced convolution shown around the spiral axis x and axially between its opposite parallel sides.

The inner and outer convolutions of the spiral wall member 46 have a plurality of adjoining curved or arcuate wall portions 48 and 50 of varying arcuate length extending axially substantially parallel to the axis x and between pairs of equally angularly spaced wall portions of inner and outer ribs or, spokes 52, and 54.

Due to continuous changes in radius and equal angular spacing of the ribs, the length of the arcuately curved spiral wall portions 48 and 50, the radial length of the inner rib 52 and total radial length of the ribs 52 and 54 and size of the cells increase progressively from the shortest adjacent inner ends to the longest adjacent outer ends of the convolutions of the spiral member 46.

The aligned inner and outer ribs 52 and 54 interconnect the inner and outermost convolutions and central axial portion of the element 40. They also extend radially from the axis x and axially between the opposite parallel sides substantially perpendicular to the axis.

Although the randomly dumpable spiral packing elements of the invention may be made of various ceramic, metal and plastic materials, they are preferably manufactured by precision injection molding, a suitable thermoplastic material, such as polyvinyl chloride; polyproplene and polystrene.

Obviously, the material or plastic selected will depend upon the environment and its resistance to the materials with which it comes in contact in the environment.

The randomly dumpable and self orientable spiral packing elements 10 and 40 of the invention may be made of various materials, and, in a variety of sizes and spiral geometric shapes.

Typically, the injection molded packing elements 10 and 40 of the invention have a maximum transverse dimension or width W, measured along an opposite side thereof and a plane passing through the axis x and center of the ribs 28, 24 and 26 of element 10 and ribs 52 and 54 connecting the inner and outer ends of the convolutions of the element 40, greater than the axial height or length H between opposite sides preferably in a ratio of maximum transverse dimension W to axial height H of from 1.5:1 to 5:1. However, the ratio of maximum transverse width to axial height H which is preferably greater than 1:1 can obviously be much greater but in most instances will not be greater than 10:1.

Also, the outer oppositely inclined spiral wall portions 18, 20 and arcuate portions 50, in the outer convolutions of the spiral members 16 and 46 need not be but are generally parallel to, equidistant from and of greater length in the spiral direction than the opposing inner spiral wall portions of the inner convolutions. Only when the inner and outer convolutions of the spiral members 16 and 46 extend around the axis x substantially parallel to and equidistant from one another, are each group of outer ribs 26 and 54 of substantially equal radial length. However in any case, the total length of the inner and outer ribs and each series of inner ribs vary in length progressively from the shortest adjacent the inner end to the longest at the outer end of the inner convolutions.

The angular spacing of the ribs 24 and 26, and 52 and 54 around the axis x can be equal or unequal as desired. When unequal, the size and volume of the series of cells in each convolution thereof will vary accordingly. However, when the radially extending ribs are angularly spaced equally about the axis x each series of cells within the inner and outer convolutions will progressively increase in size, area and volume from the smallest at the inner end to the largest at the outer ends of the inner and outer convolutions.

As shown in FIG. 2 the element 10 has three inner and three outer cells divided by three equally spaced ribs 24 and 26 spaced 60° apart in the upper 180° half thereof and four inner and four outer cells divided by four equally spaced ribs 24 and 26 spaced 45° apart in the lower 180° half of the element. Hence, each series of equally spaced inner and outer cells, in both the upper and lower halves and between the convolutions of element 10, progressively increase in size, area and volume for an angular distance of 180°.

Likewise, each series of the spiral wall portions 18 and 20 in the upper and lower halves of the element 10 progressively increase in length for each 180° half thereof.

The element 40 shown in FIG. 7 has three ribs and cells angularly spaced 60° apart in each 180° half of the element. Thus the element 40 has six equally angularly spaced ribs and cells about the axis x, inner and outer series of cells which progressively increase in size from the smallest adjacent the inner ends to the largest adjacent the outer ends of the convolutions.

Alternatively, the spiral wall portions 18, 20 and the ribs 24 and 26 of the element 10 may be inclined in one direction only or if desired they may be straight and parallel relative to a plane extending through the axis x and perpendicular to the opposite sides 12 and 14.

Likewise, the aligned ribs 52 and 54 and arcuate spiral wall portion 48 and 50 of the element 40 may be oppositely inclined or inclined in one direction. Also, the outer and inner convolution of the spiral element 46 may be inclined toward or away from the axis or oppositely inclined relative to one another and the axis x.

Although spiral packing elements of the invention are preferably injection molded they may be extruded to the polygonal and curvilinear shape and cut off to the desired axial length H. When extruded however, the wall portions and surfaces thereof will not be inclined or tapered but parallel to the axis x.

Further, the wall portions of the spiral wall member and of the ribs are preferably imperforate but may if desired have apertures of various shapes and sizes therethrough and inwardly or outwardly projecting tabs extending parallel to or inclined relative to the axis x.

Although, specific examples of spiral packing elements of the invention have been described it is to be understood that many modifications may be made of the invention without departing from the spirit thereof and the invention includes all modifications and equivalents which fall within the scope of the appended claims.

We claim:

1. A randomly dumpable self orienting spiral packing element comprising:
    a spiral wall member of predetermined wall thickness and axial height extending more than one spaced convolution around an axis and axially between opposite sides of the packing element and having
    an inner convolution spaced from the axis; and
    at least a part of at least one other outer convolution extending and spaced from the inner convolution;
    a plurality of angularly spaced radial ribs of which at least one differs in radial length and radial wall portions thereof extending axially between the opposite sides and radially between the axis and adjoining wall portions of the spiral wall member; and
    a plurality of open end cells of which at least one differs in size and volume extending axially between the opposite sides, angularly spaced radial wall portions of the ribs and adjoining wall portions of the spiral member; and a maximum transverse dimension between diametrically opposite wall portions of the packing element measured along an opposite side thereof greater than its axial length between the opposite sides.

2. A randomly dumpable self orienting spiral packing element according to claim 1 wherein the spiral wall member has
    a substantially curvilinear spiral shape; and a plurality of adjoining arcuately curved wall portions extending about the axis, and between angularly spaced radial wall portions of the rib at angularly spaced opposite sides of the cells.

3. A randomly dumpable self orienting spiral packing element according to claim 1 wherein the spiral member has
    a substantially polygonal spiral shape, and a plurality of adjoining angular wall portions extending about the axis and between angularly spaced radial wall portions of the ribs at angularly spaced opposite sides of the cells.

4. A randomly dumpable self orienting spiral packing element according to claim 3 wherein the adjoining angular wall portions of the spiral wall member are inclined relative to the axis and the opposite sides of the spiral packing element.

5. A randomly dumpable self orienting spiral packing element according to claim 4 wherein the angularly spaced radial wall portions of the radial ribs are inclined relative to the axis and the opposite sides of the packing element.

6. A randomly dumpable self orienting spiral packing element according to claim 5 wherein the adjoining angular wall portions of the spiral member are oppositely inclined relative to one another and the axis.

7. A randomly dumpable self orienting spiral packing element according to claim 6 wherein the angularly spaced radial portions of the ribs at opposite sides of the cells are oppositely inclined relative to each other and the axis.

8. A randomly dumpable self orienting spiral packing element according to claim 7 wherein the cells of the packing element include
    alternate and adjacent oppositely tapered cells; and
    wherein the inclined wall portions of the spiral member and of the ribs about the alternate tapered cell, converge toward one another and center thereof; and
    the inclined wall portions of the spiral member and of the ribs about the adjacent tapered cell diverge away from one another and center thereof.

9. A randomly dumpable self orienting packing element according to claim 8 wherein the angularly spaced radial ribs of the packing element vary in total radial length between the axis and the outer convolution and radial length between the axis and the inner convolution.

10. A randomly dumpable self orienting spiral packing element according to claim 9 wherein the cells of the packing element vary in size and volume.

* * * * *